US008315443B2

(12) United States Patent
Bi et al.

(10) Patent No.: US 8,315,443 B2
(45) Date of Patent: Nov. 20, 2012

(54) VIEWPOINT DETECTOR BASED ON SKIN COLOR AREA AND FACE AREA

(75) Inventors: Nin Bi, San Diego, CA (US); Yingyong Qi, San Diego, CA (US); Qing Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 12/765,292

(22) Filed: Apr. 22, 2010

(65) Prior Publication Data

US 2011/0262001 A1  Oct. 27, 2011

(51) Int. Cl.
*G06K 9/00* (2006.01)
(52) U.S. Cl. .......................... 382/118; 382/103; 382/165
(58) Field of Classification Search .................. 382/118, 382/154, 162, 165, 103
See application file for complete search history.

(56) References Cited

U.S. PATENT DOCUMENTS

| 6,148,092 | A * | 11/2000 | Qian .............................. 382/118 |
| 6,188,777 | B1 | 2/2001 | Darrell et al. |
| 6,233,004 | B1 | 5/2001 | Tanaka et al. |
| 6,608,622 | B1 | 8/2003 | Katayama et al. |
| 7,221,366 | B2 * | 5/2007 | Uyttendaele et al. ......... 345/427 |
| 8,040,389 | B2 * | 10/2011 | Utsugi ....................... 348/222.1 |
| 2005/0024558 | A1 | 2/2005 | Vesely et al. |
| 2005/0264857 | A1 | 12/2005 | Vesely et al. |
| 2005/0275913 | A1 | 12/2005 | Vesely et al. |
| 2007/0162922 | A1 | 7/2007 | Park |
| 2007/0230743 | A1 | 10/2007 | Mannerheim et al. |
| 2010/0079449 | A1 | 4/2010 | McCarthy |
| 2010/0100853 | A1 * | 4/2010 | Ciudad et al. ................. 715/856 |

FOREIGN PATENT DOCUMENTS

EP          2116919 A1    11/2009
WO     WO 9935606 A1     7/1999

OTHER PUBLICATIONS

Suenaga, Tsuyoshi et al. "image-Based 3D Display with Motion Parallax Using Face Tracking," Proceedings IEEE Symposium on 3D User Interfaces 2008, Reno, NV, Mar. 8-9, 2008, pp. 161-162.
Higashi, Takahiro et al. "The Three Dimensional Display for User Interface in Free Viewpoint Television System" Proceedings of Electronic imaging, Science and Technology, Stereoscopic Displays and Virtual Reality Systems XI, San Jose, CA, Jan. 19-22, 2004, vol. 5291, pp. 237-244.
International Search Report and Written Opinion—PCT/US2011/033543, International Search Authority—European Patent Office—Aug. 3, 2011.

* cited by examiner

*Primary Examiner* — Daniel Mariam
(74) *Attorney, Agent, or Firm* — Michael DeHaemer; James R. Gambale, Jr.

(57) ABSTRACT

In a particular illustrative embodiment, a method of determining a viewpoint of a person based on skin color area and face area is disclosed. The method includes receiving image data corresponding to an image captured by a camera, the image including at least one object to be displayed at a device coupled to the camera. The method further includes determining a viewpoint of the person relative to a display of the device coupled to the camera. The viewpoint of the person may be determined by determining a face area of the person based on a determined skin color area of the person and tracking a face location of the person based on the face area. One or more objects displayed at the display may be moved in response to the determined viewpoint of the person.

27 Claims, 7 Drawing Sheets

VIEWPOINT DETECTOR BASED ON SKIN COLOR AREA AND FACE AREA

FIELD

The present disclosure is generally related to detecting a viewpoint based on skin color area and face area.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, and a display to display an image viewed from a viewpoint of a viewer. However, typically only images in the direction in which the camera is aimed can be observed. That is, the viewer typically sees the same image even if the viewer moves his/her viewpoint.

SUMMARY

When recreating a three-dimensional (3D) visual effect on a two-dimensional (2D) display screen, stereoscopic vision from both eyes of a viewer is typically used as a factor to create the visual effect. However, another factor, namely the viewer's location and/or the view direction, can be used as well to recreate the 3D visual effect. The viewer's location or viewpoint relative to a display of a device having a camera can be determined based on face tracking, eye tracking, or by a combination of both face tracking and eye tracking by using the camera at the device. Once the viewpoint of the viewer is determined, an object within an image captured by the camera and displayed on the display may be moved based on the detected viewpoint of the viewer. By applying the viewer's location and view direction, a system can be designed that runs multimedia applications from different viewpoints based on a viewer's location.

In a particular illustrative embodiment, a method of determining a viewpoint of a person based on a skin color area and a face area is disclosed. The method includes receiving image data corresponding to an image captured by a camera. The method further includes determining a viewpoint of the person relative to a display of a device coupled to the camera. The viewpoint of the person may be determined by determining a face area of the person based on a determined skin color area of the person and by tracking a face location of the person based on the face area. An object may be moved within the image in response to the determined viewpoint of the person.

In another particular embodiment, an apparatus configured to determine a viewpoint of a person based on a skin color area and a face area of the person is disclosed. The apparatus includes a skin color detector configured to detect a skin color area of a person within image data corresponding to an image captured by a camera. The apparatus further includes a face detector configured to detect a face area of the image based on the detected skin color area of the person. The apparatus further includes a viewpoint detector configured to detect a viewpoint of the person relative to a display of a device coupled to the camera. The viewpoint of the person may be determined based at least in part on the detected skin color area, where the viewpoint detector is further configured to track a face location of the person based on the detected face area. One or more objects may be moved within the image in response to the determined viewpoint of the person.

One particular advantage provided by at least some of the disclosed embodiments is that a viewpoint of a viewer may be detected such that objects on a display may be moved based on the detected viewpoint to create a three dimensional visual effect on a two dimensional display without the need for a lenticular display or special glasses.

Other aspects, advantages, and features of the present disclosure will become apparent after review of the entire application, including the following sections: Brief Description of the Drawings, Detailed Description, and the Claims.

I. BRIEF DESCRIPTION OF THE DRAWINGS

II. DETAILED DESCRIPTION

A viewer's location or viewpoint relative to a display of a device having a camera can be determined based on a skin color area and a face area of the viewer by using the camera at the device. Once the viewpoint of the viewer is determined, one or more objects within an image captured by the camera and displayed on the display can be moved based on the detected viewpoint of the viewer.

Figure 1:
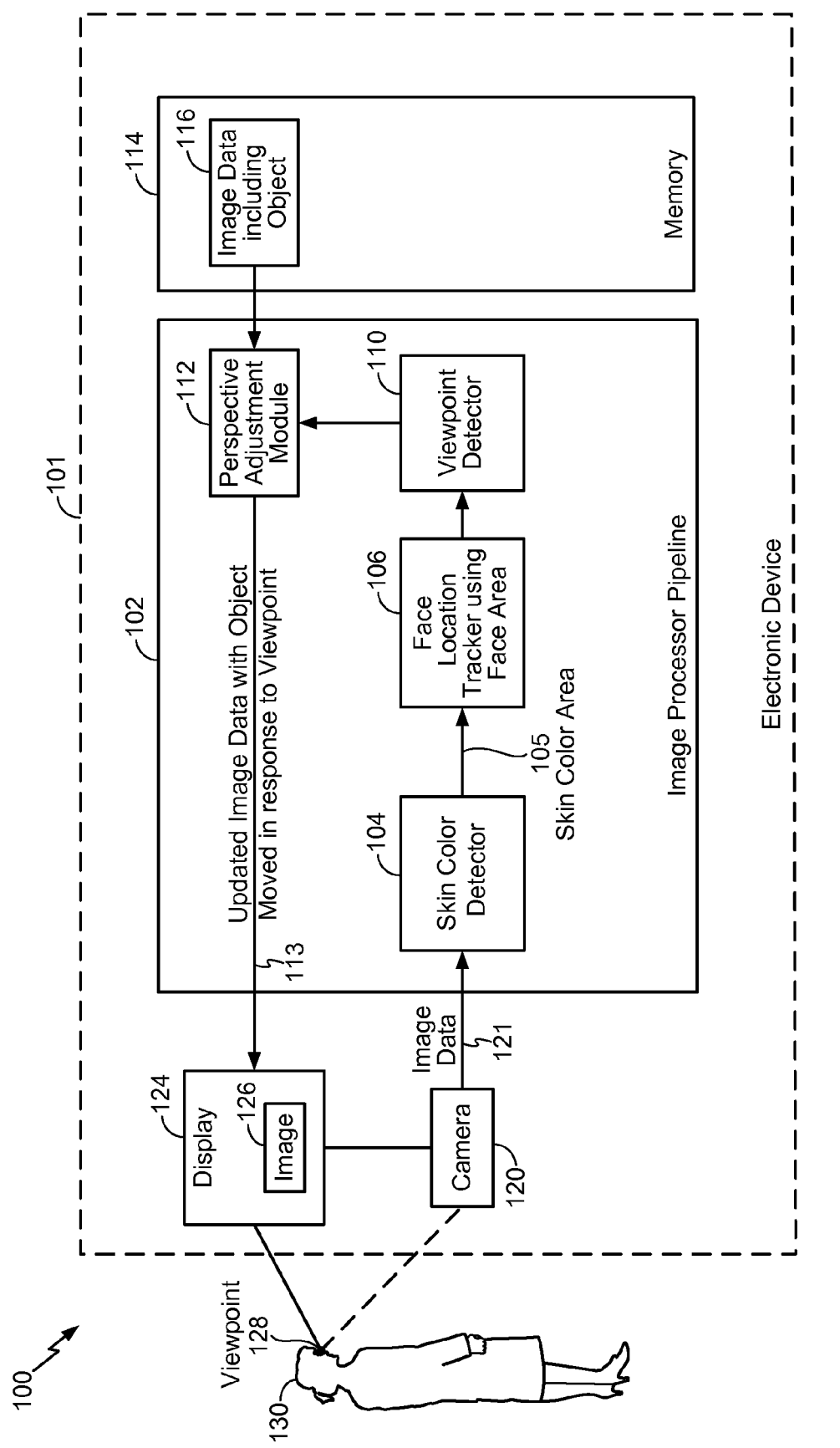
FIG. 1 is a block diagram of a particular illustrative embodiment of a system to display image data based on a person's viewpoint.

Referring to FIG. 1, a particular illustrative embodiment of a system to display image data based on a person's perspective is depicted and generally designated 100. The system 100 includes an electronic device 101 that includes a display 124, a camera 120, and an image processing pipeline 102 coupled to the display 124 and to the camera 120. The electronic device 101 is shown in proximity of a person 130. The electronic device 101 also includes a memory 114 that stores image data 116 including an object. The electronic device 101 is configured to determine a viewpoint 128 of the person 130 relative to the display 124, and to adjust a perspective of an image 126 displayed on the display 124 based on the location of the viewpoint 128.

In a particular embodiment, the camera 120 is configured at a position such that the person 130 is in view of the camera 120 while the person 130 is viewing the display 124. In particular, the camera 120 may include a lens and an image sensor (not shown). The image sensor may be configured to acquire image data 121 and provide the image data 121 to the image processor pipeline 102.

In a particular embodiment, the image processor pipeline 102 is configured to receive the image data 121 and to adjust a perspective of the image 126 of the display 124 based upon a detected viewpoint 128 of the person 130. The image processor pipeline 102 includes a skin color detector 104, a face location tracker 106, a viewpoint detector 110, and a perspective adjustment module 112.

In a particular embodiment, the skin color detector 104 receives image data corresponding to an image captured by the camera 120. For example, the image data that is received at the skin color detector 104 may be received directly from the camera 120, such as the image data 121. Alternatively, the skin color detector 104 may receive image data that has been processed within the image processor pipeline 102 such as via demosaicing, bad pixel correction, or other image processing. The skin color detector 104 may be configured to compare chrominance values of the image data 121 to determine whether each particular pixel of the image data 121 corresponds to a skin color region or to a non-skin color region. To illustrate, the skin color detector 104 may compare a chrominance red value for a particular pixel to an upper and lower chrominance red threshold indicating non-skin areas. In addition, the skin color detector 104 may determine a chrominance blue value of a pixel of the image data 121 and compare the chrominance blue value to one or more chrominance blue thresholds indicating borders between skin areas and non-skin areas. The skin color detector 104 is configured to generate an output indicating a skin color area 105.

In a particular embodiment, the face location tracker 106 may be configured to receive the skin color area 105 from the skin color detector 104 and to track a location of a face within the image data 121. For example, the face location tracker 106 may examine one or more of the identified skin color areas 105 to perform face recognition or otherwise determine whether a face is present within the image data 121. In a particular embodiment, the face location tracker 106 may be configured to receive the skin color area 105 from the skin color detector 104 including the pixels that have a chrominance value within the skin color region. The face location tracker 106 may be configured to identify a row of the image data according to a first one dimensional search based on a chrominance mean value and a chrominance variance value, and the face location tracker 106 may be configured to identify a column of the image data according to a second one dimensional search based on the chrominance mean value and the chrominance variance value. In a particular embodiment, a first count of pixels corresponding to a row of a selected pixel within the image data may be incremented in response to a comparison between the chrominance value of the selected pixel to the chrominance mean value satisfying a difference threshold, and a corresponding column of the selected pixel within the image data may be incremented in response to a comparison between the chrominance value of the selected pixel to the chrominance mean value satisfying a difference threshold. An estimated center pixel location may be determined based on the first count of pixels and the second count of pixels.

In a particular embodiment, the viewpoint detector 110 is configured to receive information indicating the located face from the face location tracker 106 and to determine a viewpoint, such as the viewpoint 128, of the person 130 based on the located face of the person 130. The viewpoint detector 110 may be configured to provide data indicating the detected viewpoint to the perspective adjustment module 112.

In a particular embodiment, the perspective adjustment module 112 is configured to receive the image data 116 including the object from the memory 114 for display at the display 124. The perspective adjustment module 112 may further be configured to receive the data indicating the detected viewpoint from the viewpoint detector 110, and to modify the image data 116 including the object in accordance with a movement of the viewpoint of the person 130. For example, due to a change in the detected viewpoint 128 of the viewer 130, the object within the image data 116 may be moved prior to being displayed at the display 124. For example, if the viewpoint of a person changes, such as the viewpoint 128 of FIG. 1, an object within the image may be moved or rotated to the left or moved or rotated to the right depending on the changed viewpoint. To illustrate, an object with a detected viewpoint at the center of the display 124, such as object 404 of FIG. 4, may be moved or rotated to the left if the viewpoint of the person changes from the center to the left. Similarly, an object with a detected viewpoint at the center of the display 124 may be moved or rotated to the right if the viewpoint of the person changes from the center to the right.

During operation, the person 130 may select the image 126 to be displayed at the display 124. While the person 130 is looking at the image 126, the camera 120 may be iteratively acquiring image data 121 of the person, which is provided to the image processor pipeline 102. The image processor pipeline 102 may track the person's 130 face by detecting skin color regions at the skin color detector 104, tracking a face location of the person at the face location tracker 106, detecting the viewpoint 128 of the person at the viewpoint detector 110, and providing the detected viewpoint data to the perspective adjustment module 112. The perspective adjustment module 112 may alter the image 126 to be displayed at the display 124 based on the detected viewpoint 128 of the person 130. The updated image data 113 with an object moved in response to the viewpoint is provided to the display 124, and the image 126 is updated. As a result, a movement of the person 130 relative to the display 124 or to the camera 120 may result in a movement of the object within the image 126, thus creating an impression of a three dimensional perspective view of the image 126. For example, a three-dimensional visual effect may be added in two-dimensional content with depth information by rendering the content with a depth dependant perspective projection.

Although the elements including the camera 120, the display 124, the image processor pipeline 102, and the memory 114 are depicted within a single electronic device 101, in other embodiments the elements may be in separate devices. For example, the camera may be coupled to a stand alone display, such as a cathode ray tube display, a plasma display, or a liquid crystal diode display.

Figure 2:
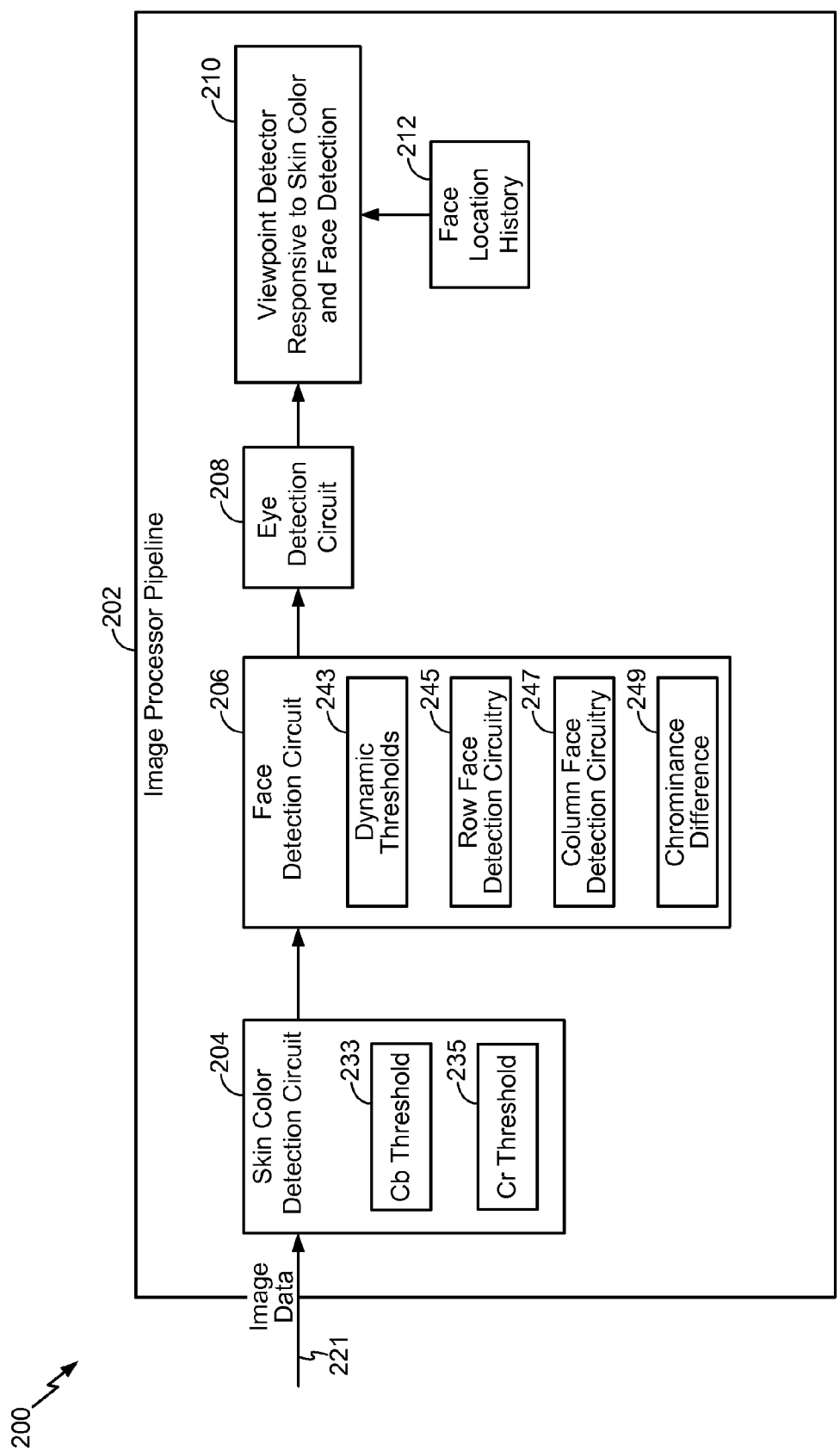
FIG. 2 is a block diagram of a particular illustrative embodiment of an image processor pipeline used in a system to display image data based on a person's viewpoint.

Referring to FIG. 2, a particular illustrative embodiment of an image processor pipeline used in a system to display image data based on a viewer's perspective is depicted and generally designated 200. The image processor pipeline 202 includes a skin color detection circuit 204, a face detection circuit 206, an eye detection circuit 208, a viewpoint detector responsive to skin color and face detection circuit 210, and a face location history circuit 212.

In a particular embodiment, the skin color detection circuit 204 may be configured to receive image data 221 corresponding to an image, and may be configured to compare chrominance values of the image data to determine whether each particular pixel of the image data corresponds to a skin color or to a non-skin color region. In a particular embodiment, the skin color detection circuit 204 includes a chrominance blue (Cb) threshold 233 and a chrominance red (Cr) threshold 235. For example, the skin color detection circuit 204 may compare a chrominance red value for a particular pixel to one or more chrominance red thresholds 235, such as an upper and lower chrominance red threshold, indicating non-skin areas. In addition, the skin color detection circuit 204 may determine a chrominance blue value of a pixel of the image data and compare the chrominance blue value to one or more chrominance blue thresholds 233 indicating borders between skin areas and non-skin areas. In a particular embodiment, the pixels having a chrominance value within the skin color range may be identified, such as by satisfying the chrominance blue threshold 233 and the chrominance red threshold 235 of the skin color detection circuit 204. The skin color detection circuit 204 may be configured to generate an output including the pixels that have a chrominance within the skin color range, indicating a skin color area.

In a particular embodiment, the face detection circuit 206 is configured to receive the skin color area output from the skin color detection circuit 204 and to detect a location of a face area within the image data. In a particular embodiment, the face detection circuit 206 includes dynamic thresholds 243, row face detection circuitry 245, column face detection circuitry 247, and chrominance difference circuitry 249.

In a particular embodiment, the face detection circuit 206 is configured to receive the output of the skin color detection circuit 204 including the pixels that have a chrominance value within the skin color range. In a particular embodiment, the row face detection circuitry 245 may be configured to identify a row of the image data and the column face detection circuitry 247 may be configured to identify a column of the image data. For example, the row face detection circuitry 245 may be configured to identify a row of the image data according to a first one dimensional search based on a chrominance mean value and a chrominance variance value, and the column face detection circuitry 247 may be configured to identify a column of the image data according to a second one dimensional search based on the chrominance mean value and the chrominance variance value. In a particular embodiment, the chrominance difference circuitry 249 may be configured to compare the chrominance value of an identified pixel to the chrominance mean value and to select the identified pixel in response to a comparison result satisfying a difference threshold. The difference threshold may be based on the chrominance variance value. In a particular embodiment, a first count of pixels or likelihood to the chrominance mean corresponding to a row of the selected pixel within the image data may be incremented when scanning more pixels within the candidate area and the difference threshold is satisfied at the pixels, and a second count of pixels or likelihood to the chrominance mean corresponding to a column of the selected pixel within the image data may be incremented when scanning more pixels within the candidate area and the difference threshold is satisfied at the pixels. In a particular embodiment, the column segment with the greatest count of pixels or likelihood to the chrominance mean that satisfies the difference threshold may be located, and the row segment with the greatest count of pixels or likelihood to the chrominance mean that satisfies the difference threshold may be located. The location of the peak column segment and the peak row segment may be used to determine an estimated center pixel location of the face area, as described in greater detail with reference to FIG. 3.

In a particular embodiment, the eye detection circuit 208 is configured to receive the face location data from the face detection circuit 206 and to detect the eyes of the person within the image data. The eye detection circuit 208 may be utilized to further refine the face location data and to confirm the location of a face within the face area.

In a particular embodiment, the viewpoint detector 210 is configured to receive information indicating the located eyes of the face from the eye detection circuit 208 and to determine a viewpoint of the person based on the located face of the person. In a particular embodiment, the viewpoint detector 210 is configured to receive prior face location data from the face location history 212. For example, in a particular embodiment, when searching the image data for the face of the person, an initial candidate search area may be set up based on historical face location data provided by the face location history 212. For example, the electronic device may have previously been trained to find the face of the person via the person's skin tone. In that case, the previous or historical face location data including skin data such as the chrominance red and chrominance blue thresholds and the mean value and variance of the skin tone, may be stored in the memory of the electronic device.

During operation, the image processor pipeline 202 may detect the person's face by detecting skin color regions at the skin color detection circuit 204, detecting the face of the person at the face detection circuit 206, detecting the eyes of the person at the eye detection circuit 208, and detecting the viewpoint of the person at the viewpoint detector 210. In a particular embodiment, the viewpoint of the person may be detected at least in part based on historical face location data provided by the face location history 212.

Figure 3:
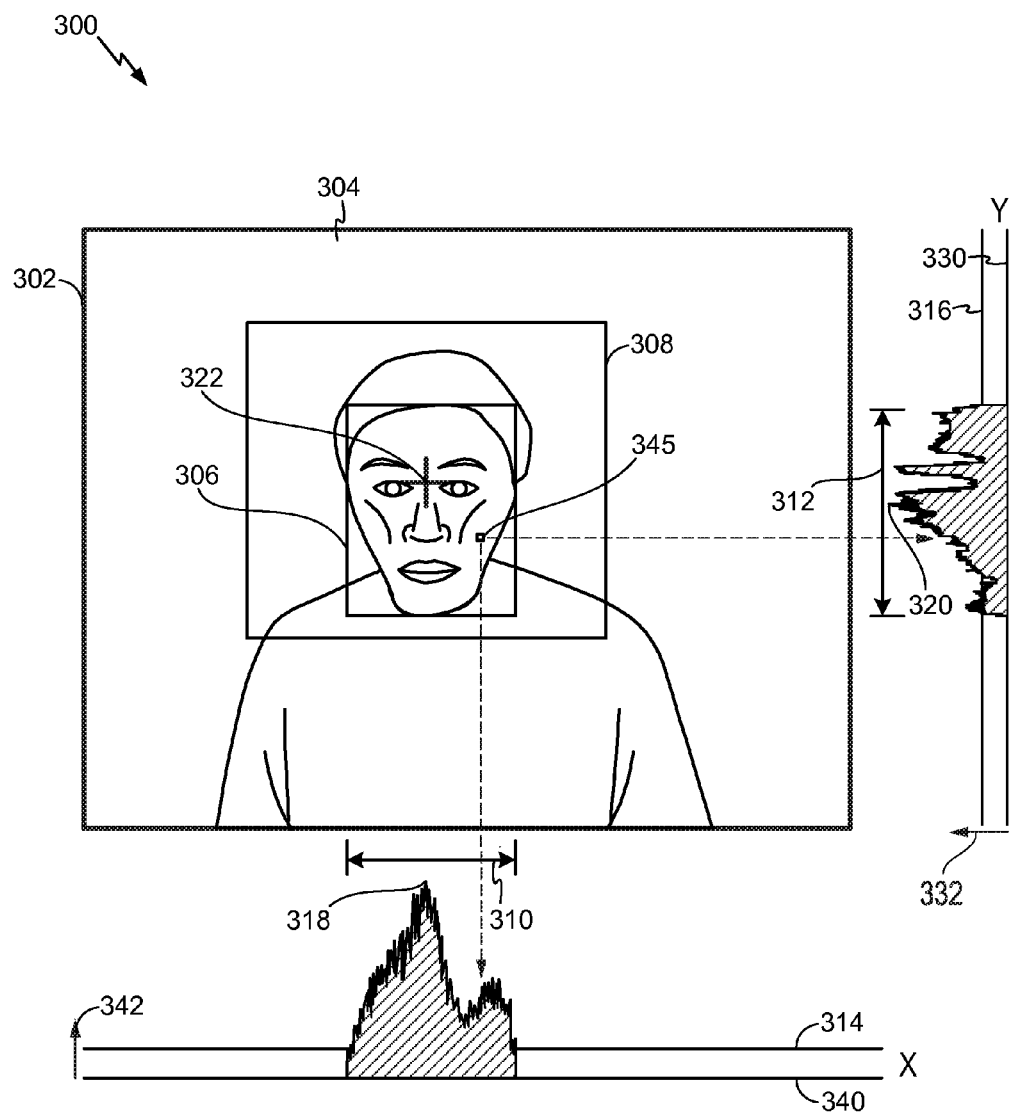
FIG. 3 is a particular illustrative embodiment of a system to display image data based on a person's viewpoint depicting likelihood values and an estimated center pixel location.

Referring to FIG. 3, a particular illustrative embodiment of a system to display image data based on a viewer's perspective is depicted and generally designated 300. A candidate area 302 includes a non-skin area 304, a face area 306, and a skin area 308. For clarity of illustration, the skin area 308 is depicted as being rectangular in shape. However, the skin area 308 may be irregularly shaped, and may contain pixels from one or more objects including non-skin objects that fall within a skin tone range. The skin area 308 includes an estimated center pixel 322 and a representative pixel under test 345. The candidate area 302 is illustrated in an X-Y coordinate system where the x-axis 340 is disposed in a horizontal direction and the y-axis 330 is disposed in a vertical direction. Horizontal likelihood values 318 (which are not used to indicate the peak location) are depicted along the x-axis 340 and vertical likelihood values 320 (which are not used to indicate the peak location) are depicted along the y-axis 330. Each horizontal likelihood value is associated with a number of pixels 342, and each vertical likelihood value is associated with a number of pixels 332. Based on the horizontal likelihood values 318, a peak horizontal segment 310 can be located, and based on the vertical likelihood values 320, a peak vertical segment 312 can be located. A first dynamic threshold 314 is set up along the x-axis 340 and a second dynamic threshold 316 is set up along the y-axis 330.

During operation, the candidate area 302 of image data related to the face area 306 of the person is scanned. For each pixel sample that is within the skin area 308, sample pixel data is accumulated. After all pixels in the candidate area 302 are scanned, skin tone thresholds are calculated and a mean value and a variance of the measured skin tone of the sampled pixel data are calculated. For each pixel sample within the skin tone thresholds, likelihood values are selectively accumulated by measuring a distance of the sampled pixel to the mean value and comparing the distance to the variance. If the distance is within the variance, horizontal likelihood values 318 and vertical likelihood values 320 are accumulated. Upon completing the selected accumulation of the horizontal likelihood values 318 and the vertical likelihood values 320, the horizontal dynamic threshold 314 and the vertical dynamic threshold 316 are set up. In a particular embodiment, a first count of pixels corresponding to a row of the selected pixel within the image data may be incremented when the horizontal likelihood (e.g., distance) measurement of the sampled pixel to the mean of the skin tone is within the variance, and a second count of pixels corresponding to a column of the selected pixel within the image data may be incremented when the vertical likelihood measurement of the sampled pixel to the mean of the skin tone is within the variance. After the horizontal dynamic threshold and the vertical dynamic threshold are set up, the peak horizontal segment from the horizontal likelihood values and the peak vertical segment from the vertical likelihood values are detected, at 634. In a particular embodiment, the column with the greatest count of pixels that satisfies the vertical likelihood measurement, or the peak column, may be located, and the row with the greatest count of pixels that satisfies the horizontal likelihood measurement, or the peak row, may be located. The location of the peak vertical segment 312 and the peak horizontal segment 310 may be used to determine an estimated center pixel location 322 of the face area 306.

Figure 4:
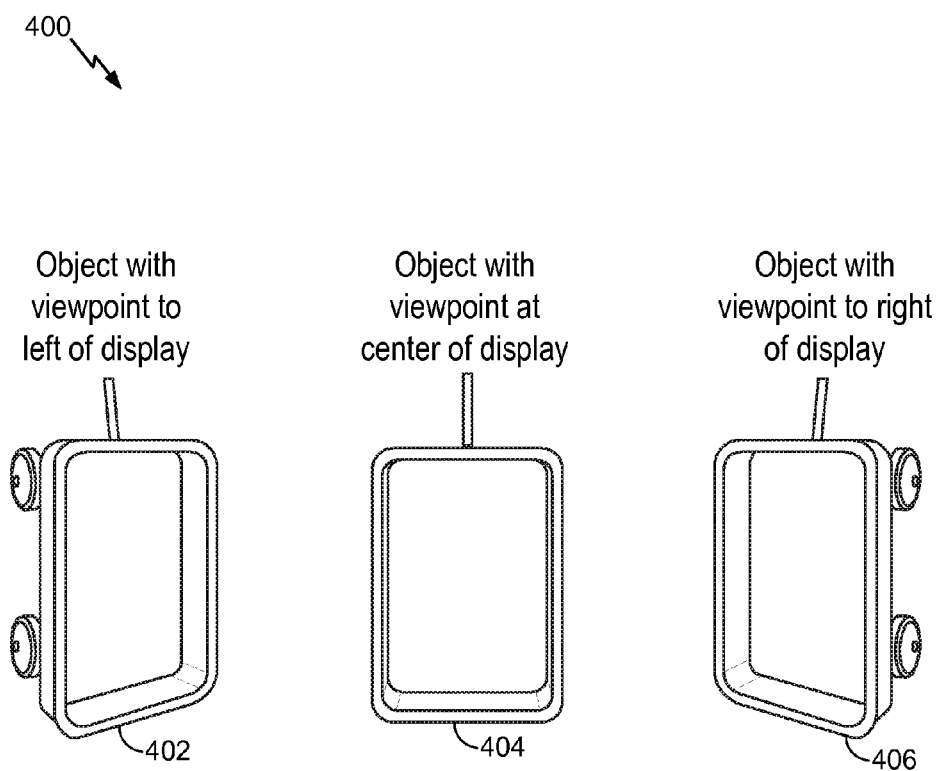
FIG. 4 is a particular illustrative embodiment of an object displayed from different viewpoints.

Referring to FIG. 4, a particular illustrative embodiment of an object within an image displayed from different viewpoints is depicted and generally designated 400. An object with a viewpoint at the left of a display is shown at 402, the object with a viewpoint at the center of a display is shown at 404, and the object with a viewpoint at the right of a display is shown at 406. For example, if the viewpoint of a person changes, such as the viewpoint 128 of FIG. 1, the object within the image may be moved or rotated to the left or moved or rotated to the right depending on the "new" or changed viewpoint. To illustrate, an object with a detected viewpoint at the center of the display, such as the display 124 of FIG. 1, may be moved or rotated to the left if the viewpoint of the person changes from the center to the left, as illustrated at 402. Similarly, an object with a detected viewpoint at the center of the display may be moved or rotated to the right if the viewpoint of the person changes from the center to the right, as illustrated at 406.

Figure 5:
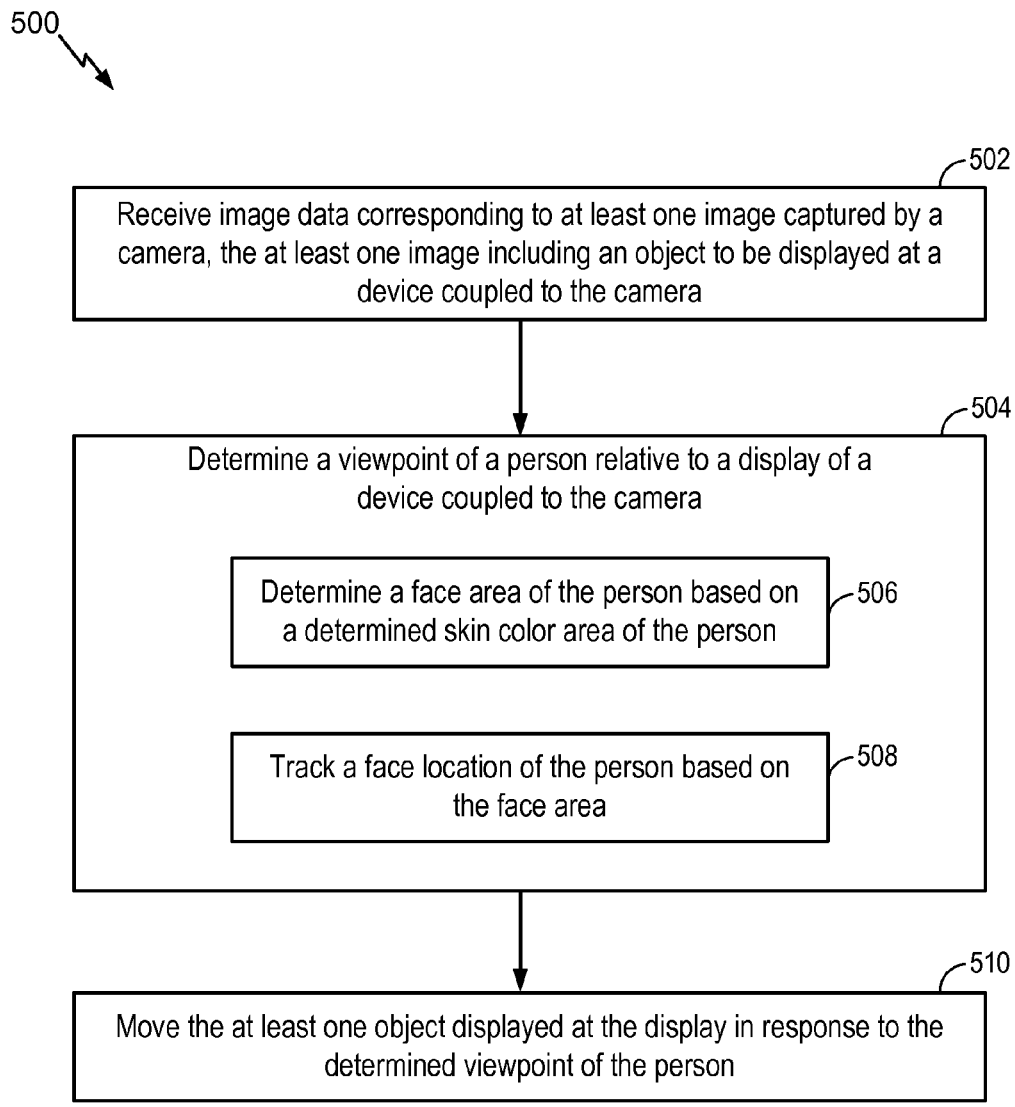
FIG. 5 is a flow diagram of a particular illustrative embodiment of a method of displaying image data based on a person's viewpoint.

Referring to FIG. 5, a flow diagram of a particular illustrative embodiment of a method of displaying image data based on a person's perspective is depicted and generally designated 500. At 502, image data corresponding to an image captured by a camera, such as the camera 120 of FIG. 1, is received. The image includes at least one object to be displayed at a device coupled to the camera. Advancing to 504, a viewpoint, such as the viewpoint 128 of FIG. 1, of the person relative to a display of a device coupled to or incorporating the camera, such as the display 124 of FIG. 1, is determined. Moving to 506, the viewpoint is determined by determining a face area of the person based on a determined skin color area, such as the skin color area 105 of FIG. 1. Continuing to 508, the viewpoint is further determined by tracking a face location of the person based on the determined face area. In a particular embodiment, the face location may be tracked by a face tracking module, such as the face location tracker 106 of FIG. 1. Proceeding to 510, one or more objects displayed at the display is moved in response to the determined viewpoint of the person.

Figure 6:
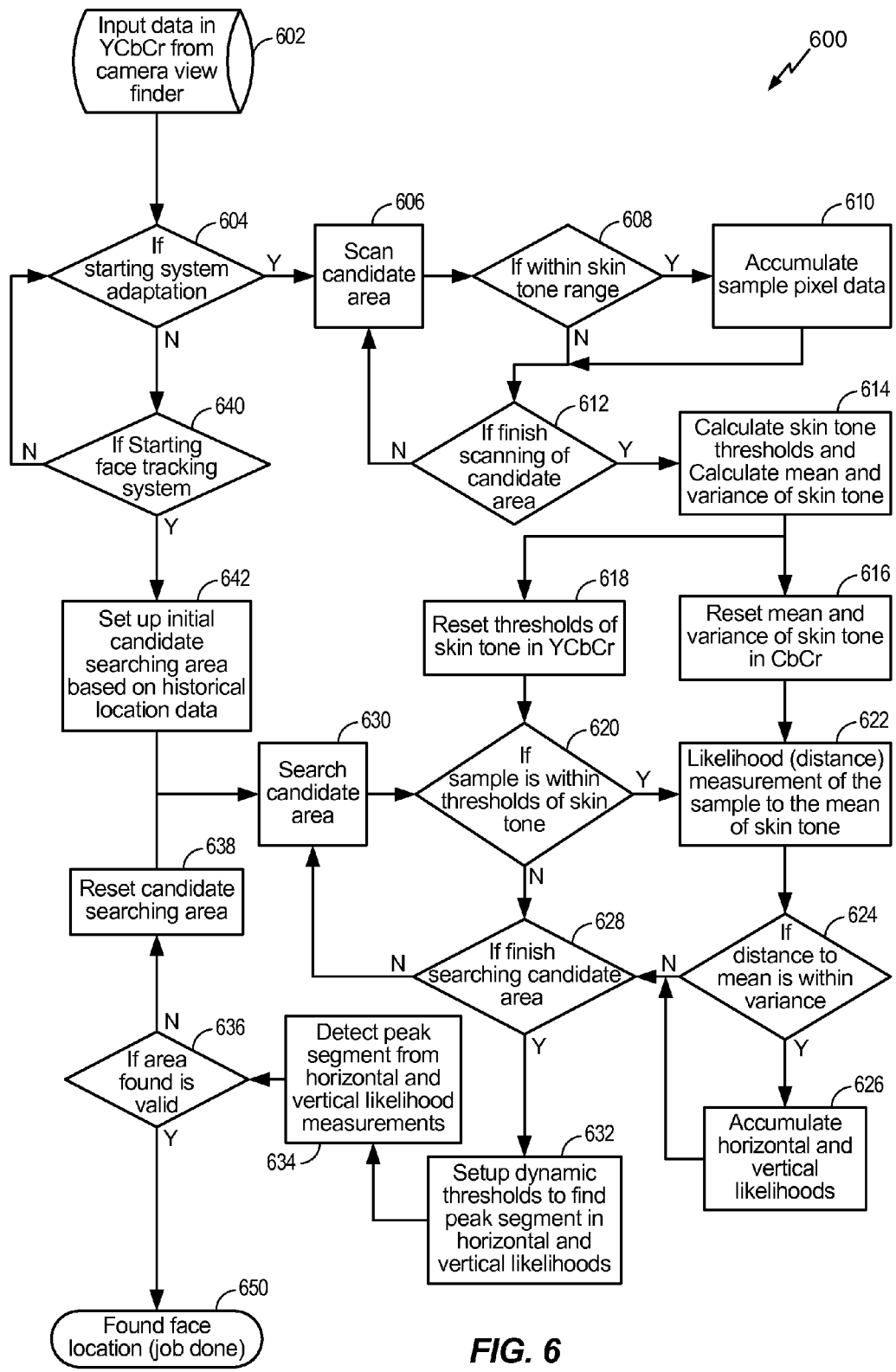
FIG. 6 is a flow diagram of a particular illustrative embodiment of a method of tracking a face utilized in determining the person's viewpoint.

Referring to FIG. 6, a flow diagram of a particular illustrative embodiment of a method of tracking a face is depicted and generally designated 600. The method 600 may be performed by a wireless electronic device, such as the electronic device 101 of the system 100 of FIG. 1.

Input data in a color space, such as a color space having a luma component (Y), a chroma blue component (Cb), and a chroma red component (Cr) (e.g., a YCbCr color space), is received from a camera viewfinder, at 602. For example image data, such as the image data 121 of FIG. 1, may be received from a camera, such as the camera 120 of FIG. 1. A determination may be made whether system adaptation is starting, at 604. For example, a determination may be made whether a user recognition training mode is entered. In a particular embodiment, the user recognition training mode may be entered into manually by the user such as by pressing a key or a button coupled to the electronic device. Alternatively, the user recognition training mode may be entered into automatically. If the user recognition training mode is entered, then a candidate area may be scanned, at 606. For example, an area of the image data related to a face area of a person may be scanned.

A determination may be made whether pixels in the candidate area are within a skin tone range, at 608. For each pixel that is within the skin tone range, sample pixel data may be accumulated, at 610, and a determination may be made whether all pixels in the candidate area have been scanned, at 612. If all pixels in the candidate area have not been scanned, then processing returns to 606.

After scanning all the pixels in the candidate area, skin tone thresholds may be calculated, at 614, and a mean value and a variance of a measured skin tone of the sampled pixel data may also be calculated, at 614. The mean value and the variance of the skin tone in Cb and in Cr may be reset, at 616, and the thresholds of the skin tone in YCbCr may be reset, at 618. As a result, the skin tone thresholds may be associated with a particular person (e.g., the user). In a face tracking process, a determination may be made whether a pixel sample is within the skin tone thresholds, at 620. If the pixel sample is within the skin tone threshold, then a likelihood measurement of the pixel sample as compared to the mean value of the skin tone may be made, at 622. In a particular embodiment, the likelihood measurement may be made by measuring a distance of the sample pixel to the mean value of the skin tone (e.g., a difference in skin tone values between the sample pixel and the mean value).

A determination may be made whether the distance is within the variance, at 624. In a particular embodiment, for each pixel sample within the skin tone thresholds, likelihood values are accumulated by measuring a distance of the sampled pixel to the mean value and comparing the distance to the variance. If the distance is within the variance, horizontal likelihood values and vertical likelihood values may be accumulated, at 626. Upon completing the accumulation of the horizontal likelihood values and the vertical likelihood values, a horizontal dynamic threshold and a vertical dynamic threshold may be set up, at 632. In a particular embodiment, a first count of pixels or likelihood to the chrominance mean corresponding to a row of the selected pixel within the image data may be incremented when the horizontal likelihood (e.g., distance) measurement of the sampled pixel to the mean of the skin tone is within the variance, and a second count of pixels or likelihood to the chrominance mean corresponding to a column of the selected pixel within the image data may be incremented when the vertical likelihood measurement of the sampled pixel to the mean of the skin tone is within the variance. After the horizontal dynamic threshold and the vertical dynamic threshold are set up, the peak horizontal segment from the horizontal likelihood values and the peak vertical segment from the vertical likelihood values may be detected, at 634. In a particular embodiment, the column with the greatest count of pixels that satisfies the vertical likelihood measurement, or the peak column, may be located, and the row with the greatest count of pixels that satisfies the horizontal likelihood measurement, or the peak row, may be located. The location of the peak vertical segment and the peak horizontal segment may be used to determine an estimated center pixel location of the face area and to determine whether the face area found is the viewer's face area, or a valid face area, at 636. If the area found is valid, then the face of the viewer is located, and the process ends, at 650. If the area found is not valid, the candidate search area may be reset, at 638, and the process may revert to 630, where the candidate area is searched.

If system adaptation is not starting at 604, then a determination may be made whether a face tracking system is starting, at 640. For example, the electronic device may have already been trained to find the face of the person via the person's skin tone and may bypass the system adaptation or training mode and go directly to a face tracking mode. In a particular embodiment, the face tracking system may be entered into manually by the user such as by pressing a key or a button coupled to the electronic device. Alternatively, the face tracking system may be entered into automatically. If the face tracking system is starting, then an initial candidate search area is set up, at 642. In a particular embodiment, the initial candidate search area may be set up based on historical face location data. In a particular embodiment, the face location data may be provided by the face location history 212 of FIG. 2. After the initial candidate search area is set up, the candidate area may be searched, at 630. If the face tracking system is not starting, then the process reverts to 604.

Once the viewpoint of the viewer is determined, one or more objects displayed on the display may be moved based on the detected viewpoint of the viewer. By applying the viewer's location and view direction, a system can be designed that runs multimedia applications from different viewpoints based on a viewer's location.

Figure 7:
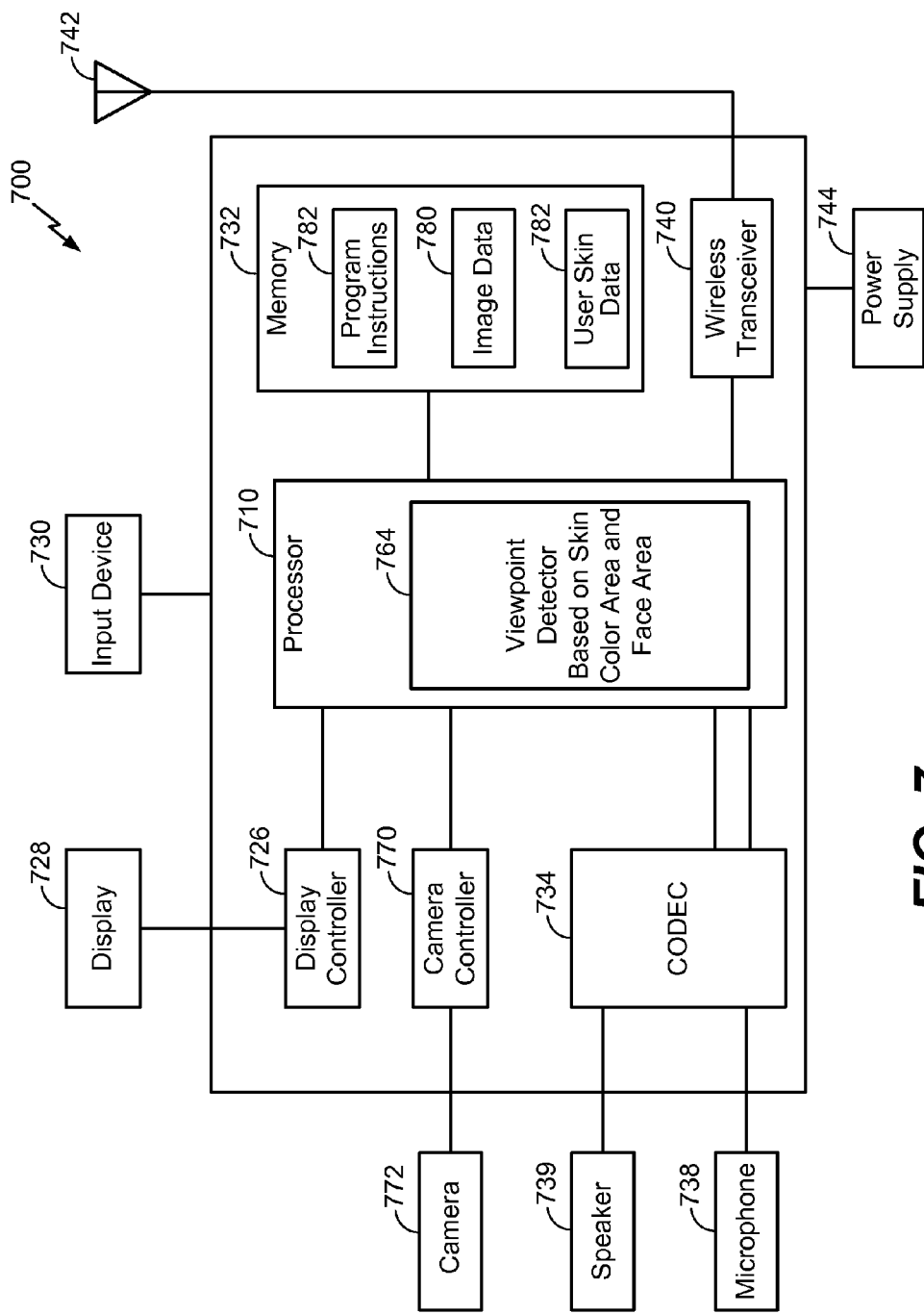
FIG. 7 is a block diagram of a representative wireless communications device including a processor having a viewpoint detector based on skin color area and face area.

FIG. 7 is a block diagram of a particular embodiment of an apparatus 700 including a viewpoint detector based on skin color area and face area 764. The apparatus 700 may be implemented in a wireless electronic device and includes a processor 710, such as a digital signal processor (DSP), coupled to a memory 732.

A camera interface controller 770 is coupled to the processor 710 and is also coupled to a camera 772, such as a video camera. The camera controller 770 may be responsive to the processor 710, such as for auto focusing and auto exposure control. A display controller 726 is coupled to the processor 710 and to a display device 728. A coder/decoder (CODEC) 734 can also be coupled to the processor 710. A speaker 736 and a microphone 738 can be coupled to the CODEC 734. A wireless interface 740 can be coupled to the processor 710 and to a wireless antenna 742.

The processor 710 may also be adapted to generate processed image data 780. The display controller 726 is configured to receive the processed image data 780 and to provide the processed image data 780 to the display device 728. The memory 732 may be configured to receive and to store the processed image data 780, and the wireless interface 740 may be configured to retrieve the processed image data 780 for transmission via the antenna 742. In addition, the memory 732 may be configured to receive and to store user skin data 782, such as the chrominance red value and the chrominance blue value of a particular pixel, the chrominance red and the chrominance blue thresholds, and the mean value and variance of the skin tone, and the wireless interface 740 may be configured to retrieve the user skin data 782 for transmission via the antenna 742.

In a particular embodiment, the viewpoint detector based on skin color area and face area 764 is implemented as computer code that is executable at the processor 710, such as computer executable instructions that are stored at a computer readable medium. For example, the program instructions 782 may include code to determine a face area of a person based on a determined skin color area of the person, code to track a face location of the person based on the face area, and code to move an object within an image in response to the detected viewpoint of the person.

In a particular embodiment, the processor 710, the display controller 726, the memory 732, the CODEC 734, the wireless interface 740, and the camera controller 770 are included in a system-in-package or system-on-chip device 722. In a particular embodiment, an input device 730 and a power supply 744 are coupled to the system-on-chip device 722. Moreover, in a particular embodiment, as illustrated in FIG. 7, the display device 728, the input device 730, the speaker 736, the microphone 738, the wireless antenna 742, the video camera 772, and the power supply 744 are external to the system-on-chip device 722. However, each of the display device 728, the input device 730, the speaker 736, the microphone 738, the wireless antenna 742, the camera 772, and the power supply 744 can be coupled to a component of the system-on-chip device 722, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software executed by a processor, firmware, or any combination thereof. The disclosed functions may be directed to a computer readable medium comprising program code that when executed in a device causes the device to perform one or more of the techniques described herein. In that case, the computer readable medium may comprise tangible storage media such as random access memory (RAM), synchronous dynamic random access memory (SDRAM), read-only memory (ROM), non-volatile random access memory (NVRAM), electrically erasable programmable read-only memory (EEPROM), FLASH memory, or the like.

The program code may be stored in memory in the form of computer readable instructions. In that case, a processor, such as a DSP, may execute instructions stored in memory in order to carry out one or more of the image processing techniques. In some cases, the techniques may be executed by a DSP that invokes various hardware components to accelerate the image processing. In other cases, the units described herein may be implemented as a microprocessor, one or more application specific integrated circuits (ASICs), one or more field programmable gate arrays (FPGAs), or some other hardware-software combination.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of tangible storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   determining a viewpoint of a person relative to a display of a device, wherein determining the viewpoint comprises determining a face area of the person based on a determined skin color area of the person and tracking a face location of the person based on the face area; and
   moving at least one object displayed at the display in response to the determined viewpoint of the person.

2. The method of claim 1, wherein the skin color area of the person is determined based on a chrominance mean value and a chrominance variance value corresponding to a skin color.

3. The method of claim 2, further comprising performing a user recognition training process to determine the chrominance mean value and the chrominance variance value skin color of the person.

4. The method of claim 1, wherein detecting the viewpoint further comprises detecting eyes within the face area to confirm a location of a face within the face area.

5. The method of claim 1, wherein determining the viewpoint further comprises selecting a first area of the image to be processed based on a prior location of a face.

6. The method of claim 5, wherein in response to no face being detected within the selected area, a second area larger than the first area is selected to be processed.

7. The method of claim 1, wherein determining the viewpoint further comprises identifying pixels having a chrominance value within a skin color range.

8. The method of claim 1, wherein tracking the face location includes estimating a center pixel location of the face area of the person by:
   in response to a user recognition training mode:
      scanning a candidate area of the image data related to the face area of the person;
      for each pixel that is within a skin tone range, accumulating sample pixel data;
   after scanning all pixels in the candidate area:
      calculating skin tone thresholds; and
      calculating a mean value and a variance of a measured skin tone of the sampled pixel data;
   for each pixel sample within the skin tone thresholds, selectively accumulating likelihood values by:
      measuring a distance of the sample pixel to the mean value;
      comparing the distance to the variance;
   when the distance is within the variance:
      accumulating horizontal and vertical likelihood values;
   upon completing the selective accumulation of the likelihood values:
      configuring dynamic thresholds to find peak segments in each of the horizontal and vertical likelihood values;
      detecting a peak horizontal segment and a peak vertical segment based on evaluation of the dynamic thresholds; and
      determining an estimated center pixel location based on the peak horizontal segment and the peak vertical segment.

9. The method of claim 8, further comprising resetting the mean value and the variance of the measured skin tone of the sampled pixel data.

10. The method of claim 8, further comprising verifying that the center pixel location is within the face area of the person.

11. The method of claim 8, further comprising initially searching the candidate area based on a prior location of the face.

12. The method of claim 8, wherein the skin tone thresholds are associated with a particular person.

13. The method of claim 1, wherein the at least one object is included in an image that is captured by a camera coupled to the device.

14. An apparatus comprising:
   a skin color detector configured to detect a skin color area of a person;
   a face detector configured to detect a face area based on the detected skin color area of the person;
   a viewpoint detector configured to detect a viewpoint of the person relative to a display of a device based at least in part on the detected skin color area, wherein the viewpoint detector is further configured to track a face location of the person based on the detected face area; and
   one or more processors configured to move an object within an image displayed at the display in response to the detected viewpoint of the person.

15. The apparatus of claim 14, wherein the skin color detector is configured to detect the skin color area based on a chrominance mean value and a chrominance variance value corresponding to a skin color.

16. The apparatus of claim 14, wherein the skin color detector is within an image processing pipeline that receives the image from a camera and provides display content to the display.

17. The apparatus of claim 14, wherein the viewpoint detector, to track the face location, is configured to estimate a center pixel location of the face area of the person by:
   in response to a user recognition training mode:
      scanning a candidate area of image data related to the face area of the person;
      for each pixel that is within a skin tone range, accumulating sample pixel data;
   after scanning all pixels in the candidate area:
   calculating skin tone thresholds; and
   calculating a mean value and a variance of a measured skin tone of the sampled pixel data;
   for each pixel sample within the skin tone thresholds, selectively accumulating likelihood values by:
      measuring a distance of the sample pixel to the mean value;

comparing the distance to the variance;
when the distance is within the variance:
accumulating horizontal and vertical likelihood values;
upon completing the selective accumulation of the likelihood values:
configuring dynamic thresholds to find peak segments in each of the horizontal and vertical likelihood values;
detecting a peak horizontal segment and a peak vertical segment based on evaluation of the dynamic thresholds; and
determining an estimated center pixel location based on the peak horizontal segment and the peak vertical segment.

18. A non-transitory computer readable tangible medium storing code executable by a computer, the code comprising:
code that is executable by the computer to determine a viewpoint of a person relative to a display of a device, wherein the code to determine a viewpoint of the person comprises code that is executable by the computer to determine a face area of the person based on a determined skin color area of the person and code that is executable by the computer to track a face location of the person based on the face area; and
code that is executable by the computer to move an object within an image displayed at the display in response to the detected viewpoint of the person.

19. The non-transitory computer readable tangible medium of claim 18, further comprising code that is executable by the computer to perform a user recognition training process to determine a chrominance mean value and a chrominance variance value skin color of the person based on a skin color of the person.

20. The non-transitory computer readable tangible medium of claim 18, wherein the code to determine the viewpoint of the person further comprises code that is executable by the computer to detect eyes within the face area to confirm a location of a face within the face area.

21. The non-transitory computer readable tangible medium of claim 18, the code for tracking a face location further comprising code for estimating a center pixel location of the face area of the person by:
in response to a user recognition training mode:
scanning a candidate area of image data related to the face area of the person;
accumulating sample pixel data for each pixel that is within a skin tone range;
after scanning all pixels in the candidate area:
calculating skin tone thresholds; and
calculating a mean value and a variance of a measured skin tone of the sampled pixel data;
for each pixel sample within the skin tone thresholds, selectively accumulating likelihood values by:
measuring a distance of the sample pixel to the mean value;
comparing the distance to the variance;
when the distance is within the variance:
accumulating horizontal and vertical likelihood values;
upon completing the selective accumulation of the likelihood values:
configuring dynamic thresholds to find peak segments in each of the horizontal and vertical likelihood values;
detecting a peak horizontal segment and a peak vertical segment based on evaluation of the dynamic thresholds; and
determining an estimated center pixel location based on the peak horizontal segment and the peak vertical segment.

22. The non-transitory computer readable tangible medium of claim 21, further comprising code that is executable by the computer to reset the mean value and the variance of the measured skin tone of the sampled pixel data.

23. The non-transitory computer readable tangible medium of claim 21, further comprising code that is executable by the computer to verify that the center pixel location is within the face area of the person.

24. The non-transitory computer readable tangible medium of claim 21, further comprising code that is executable by the computer to initially search the candidate area based on a prior location of the face.

25. An apparatus comprising:
means for determining a viewpoint of a person relative to a display of a device, wherein the means for determining the viewpoint comprises means for determining a face area of the person based on a determined skin color area of the person and means for tracking a face location of the person based on the face area; and
means for moving an object within an image displayed at the display in response to the detected viewpoint of the person.

26. The apparatus of claim 25, wherein the skin color area of the person is determined based on a chrominance mean value and a chrominance variance value corresponding to a skin color.

27. The apparatus of claim 25, wherein the means for tracking the face location includes means for estimating a center pixel location of the face area of the person by:
in response to a user recognition training mode:
scanning a candidate area of image data related to the face area of the person;
for each pixel that is within a skin tone range, accumulating sample pixel data;
after scanning all pixels in the candidate area:
calculating skin tone thresholds; and
calculating a mean value and a variance of a measured skin tone of the sampled pixel data;
for each pixel sample within the skin tone thresholds, selectively accumulating likelihood values by:
measuring a distance of the sample pixel to the mean value;
comparing the distance to the variance;
when the distance is within the variance:
accumulating horizontal and vertical likelihood values;
upon completing the selective accumulation of the likelihood values:
configuring dynamic thresholds to find peak segments in each of the horizontal and vertical likelihood values;
detecting a peak horizontal segment and a peak vertical segment based on evaluation of the dynamic thresholds; and
determining an estimated center pixel location based on the peak horizontal segment and the peak vertical segment.

* * * * *